US009517786B2

(12) United States Patent
Chang et al.

(10) Patent No.: US 9,517,786 B2
(45) Date of Patent: Dec. 13, 2016

(54) STROLLER FRAME WITH A HIDABLE RELEASE ACTUATOR

(71) Applicant: LERADO (ZHONG SHAN) INDUSTRIAL CO., LTD., Zhong Shan, Guang Dong Province (CN)

(72) Inventors: Chen-Tai Chang, Chiayi County (TW); Ho-Sheng Chen, Chiai County (TW); Ping-Ching Lin, Taoyuan County (TW); Chia-Ming Shen, Kaohsiung (TW)

(73) Assignee: Dorel Juvenile (Zhongshan) Product Co., Ltd., Zhong Shan, Guang Dong (CN)

( * ) Notice: Subject to any disclaimer, the term of this patent is extended or adjusted under 35 U.S.C. 154(b) by 0 days.

(21) Appl. No.: 14/323,736

(22) Filed: Jul. 3, 2014

(65) Prior Publication Data

US 2015/0008659 A1    Jan. 8, 2015

(30) Foreign Application Priority Data

Jul. 5, 2013    (CN) ...................... 2013 2 0397254 U

(51) Int. Cl.
*B62B 7/14*    (2006.01)
*B62B 7/06*    (2006.01)
*B62B 7/08*    (2006.01)

(52) U.S. Cl.
CPC ................. *B62B 7/062* (2013.01); *B62B 7/08* (2013.01); *B62B 7/145* (2013.01); *B62B 7/147* (2013.01); *B62B 2205/20* (2013.01)

(58) Field of Classification Search
CPC ............ B62B 7/006; B62B 7/06; B62B 7/062; B62B 7/064; B62B 7/08; B62B 7/14; B62B 7/145; B62B 7/147; B62B 9/12; B62B 2205/20
See application file for complete search history.

(56) References Cited

U.S. PATENT DOCUMENTS 4,216,974 A * 8/1980 Kassai .................... B62B 7/062
280/42
5,755,455 A * 5/1998 Chen ......................... B62B 7/08
280/42

(Continued)

FOREIGN PATENT DOCUMENTS

CN    202574327    * 12/2012

*Primary Examiner* — Emma K Frick
(74) *Attorney, Agent, or Firm* — Muncy, Geissler, Olds & Lowe, P.C.

(57) ABSTRACT

A stroller frame with a hidable release actuator includes a foldable frame, a locking mechanism, a release mechanism and a baby carrier. The locking mechanism is mounted on the foldable frame for locking the foldable frame in the erected configuration. The release mechanism has a release actuator operatively mounted on the foldable frame for unlocking the locking mechanism by rotation in either a forward direction or a rearward direction. The baby carrier has a deployed position to support a baby occupant thereon and can hide the release actuator thereunder. The baby carrier can be converted into a folded position to permit the access to the release actuator. By this arrangement, to prevent the caregiver from accessing the release actuator, so as to avoid accidentally folding of the foldable frame before the baby occupant being held up from the baby carrier.

15 Claims, 9 Drawing Sheets

(56) References Cited

U.S. PATENT DOCUMENTS

| | | | | |
|---|---|---|---|---|
| 6,811,178 B2* | 11/2004 | Tomasi | ............... | B62B 7/064 |
| | | | | 280/642 |
| 7,422,230 B2* | 9/2008 | Chuan | ............... | B62B 7/08 |
| | | | | 280/642 |
| 8,061,732 B2* | 11/2011 | Song | ............... | B62B 7/08 |
| | | | | 280/639 |
| 8,087,689 B2* | 1/2012 | Fritz | ............... | B62B 7/062 |
| | | | | 280/647 |
| 8,408,580 B2* | 4/2013 | Liao | ............... | B62B 7/086 |
| | | | | 280/642 |
| 8,491,000 B2* | 7/2013 | Yeh | ............... | B62B 9/102 |
| | | | | 280/642 |
| 8,936,267 B2* | 1/2015 | Li | ............... | B62B 7/08 |
| | | | | 280/30 |
| 8,979,114 B2* | 3/2015 | Cheng | ............... | B62B 7/062 |
| | | | | 280/642 |
| 9,096,250 B2* | 8/2015 | Cheng | ............... | B62B 7/068 |
| 2006/0214397 A1* | 9/2006 | Dotsey | ............... | B62B 7/08 |
| | | | | 280/647 |
| 2014/0064829 A1* | 3/2014 | Li | ............... | B62B 7/08 |
| | | | | 403/81 |

* cited by examiner

STROLLER FRAME WITH A HIDABLE RELEASE ACTUATOR

BACKGROUND OF THE INVENTION

Field of the Invention

The present invention relates to a stroller frame with a hidable release actuator, especially to a stroller frame having a baby carrier can hide the hidable release actuator in an erected position, and permit to access the hidable release actuator when the baby carrier has been converted into a folded position.

Description of the Related Art

The release mechanism of traditional foldable stroller is normally mounted on the handgrip for releasing the lockable joint assembly. To prevent care-givers from folding the frame mistakenly, a locking mechanism is provided on the release mechanism. Users have to unlatch the locking mechanism before activating the release mechanism.

As the locking mechanism and the release mechanism are located at a same position, care-givers who are not familiar with the operation procedures, incidental collapsing or improper folding of the frame might occur to endanger the baby occupant.

SUMMARY OF THE INVENTION

To avoid above-mentioned problem, the present invention provides a stroller frame with a hidable release actuator includes a foldable frame, a locking mechanism, a release mechanism and a baby carrier.

The locking mechanism is mounted on the foldable frame for locking the foldable frame in the erected configuration.

The release mechanism has a release actuator operatively mounted on the foldable frame for unlocking the locking mechanism by rotation in either a forward direction or a rearward direction.

The baby carrier has a deployed position to support a baby occupant thereon and can hide the release actuator thereunder. The baby carrier can be converted into a folded position to permit the access to the release actuator.

By this arrangement, to prevent the care-giver from accessing the release actuator, so as to avoid accidentally folding of the foldable frame before the baby occupant being held up from the baby carrier.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
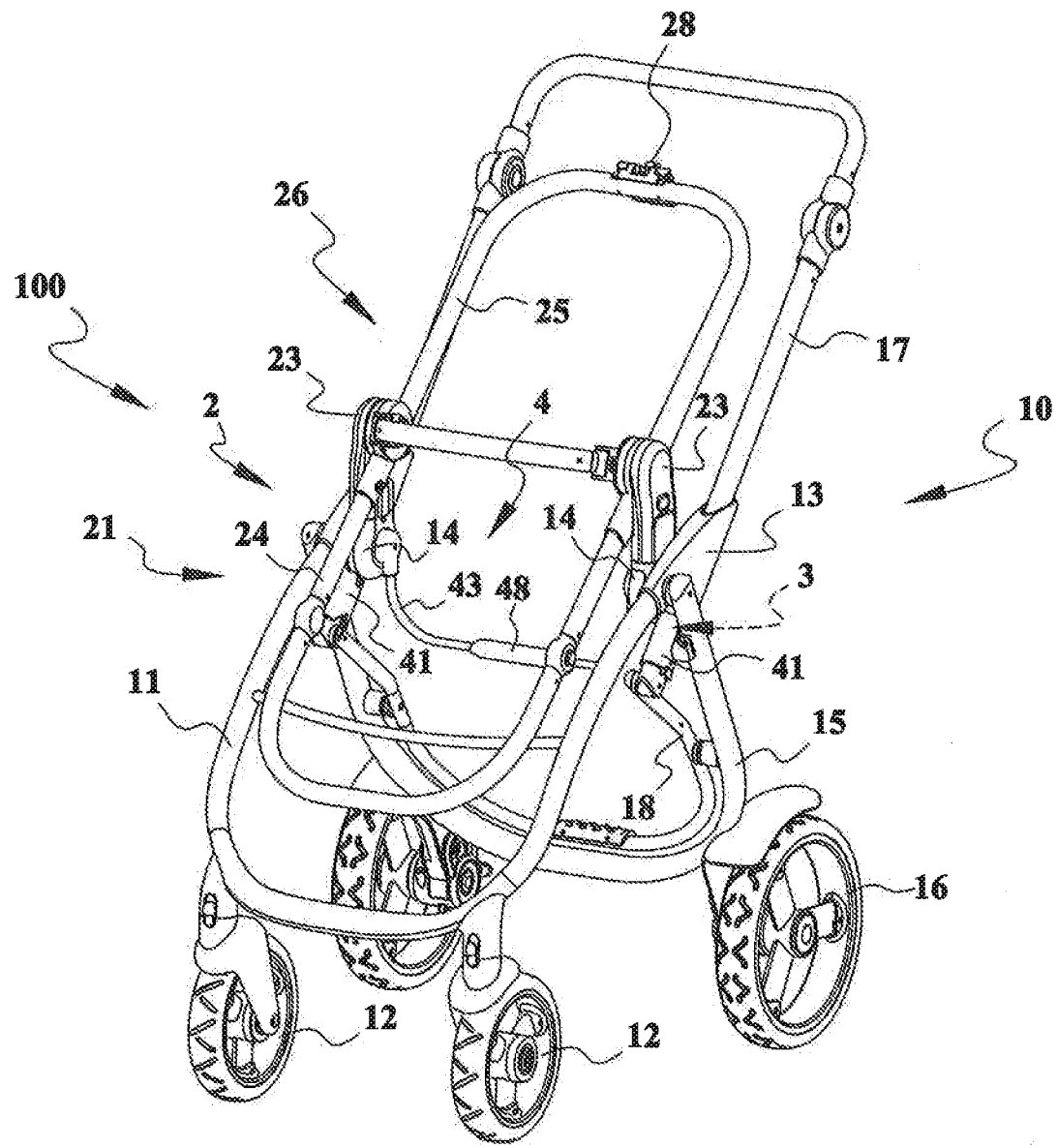
FIG. 1 is a perspective view showing the stroller frame with a hidable release actuator according to the present invention.

Referring to FIGS. 1 to 8, a stroller frame with a hidable release actuator according to the present invention includes a foldable frame 10, a locking mechanism 3, a release mechanism, 4 and a baby carrier 2.

The foldable frame 10 is configured to have an erected configuration 100 for use and a folded configuration 200 for storage in a compact size.

The locking mechanism 3 is mounted on the foldable frame 10 for locking the foldable frame in the erected configuration 100.

The release mechanism 4 has a release actuator 43 operatively mounted on the foldable frame 10 for unlocking the locking mechanism 3 by rotation in either a forward. direction 45 or a rearward direction 46.

The baby carrier 2 has a deployed position 26 to support a baby occupant thereon and hide the release actuator 43 thereunder, and a folded position 27 to permit the access to the release actuator 43. By this arrangement, to prevent the user from pushing or pulling the release actuator 43 to fold the foldable frame 10 accidentally before baby occupant being held up from the baby carrier 2 by care-giver.

Figure 2:
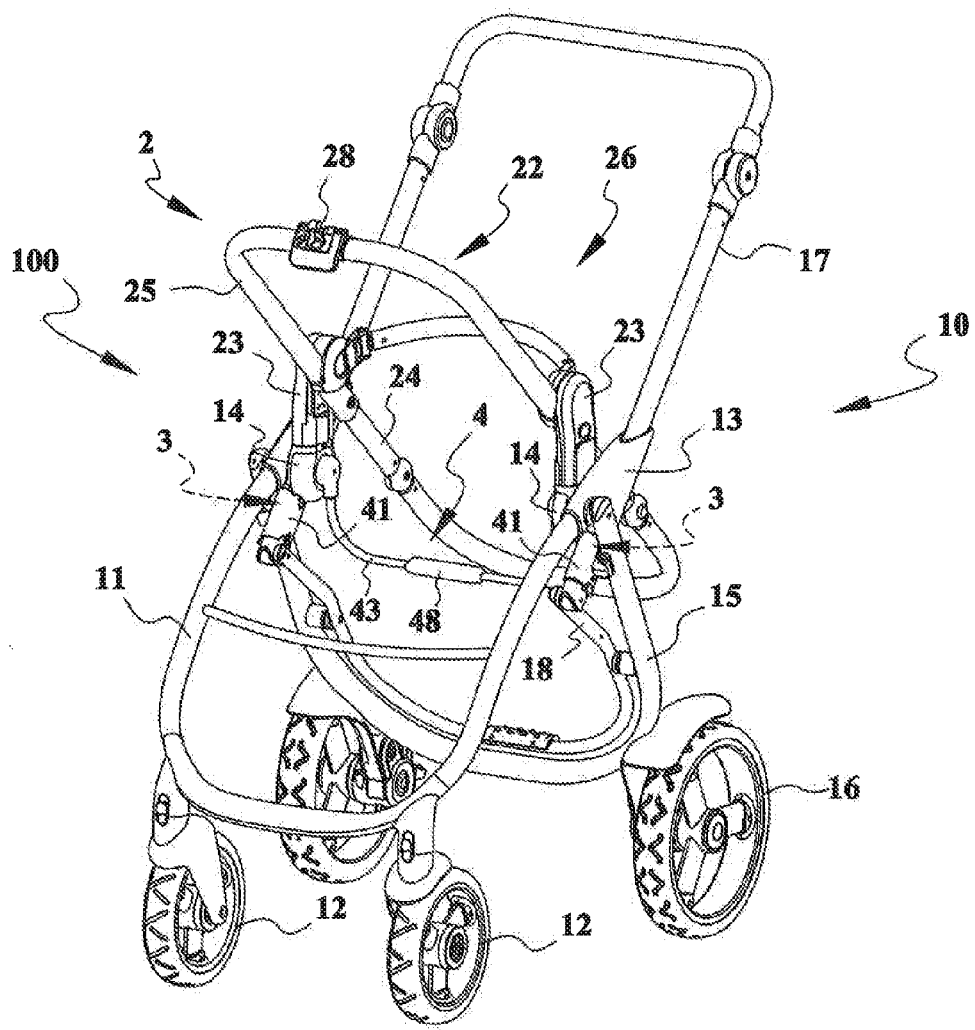
FIG. 2 is another perspective view showing the baby carrier of the stroller frame of FIG. 1 being mounted in an opposite direction and facing backward.

Preferably, the foldable frame 10 may be equipped with a pair of sockets 14 for releasably connecting the baby carrier 2 to the foldable frame 10. In one embodiment of the present invention, the baby carrier 2 is selectable to connect to the foldable frame 10 either in a forward direction 21 as shown in FIG. 1 or in a rearward direction 22 as shown in FIG. 2.

The baby carrier 2 can be embodied as a bed, cradle or a seat, which may include at least a connector 23, a seat frame 24 and a backrest frame 25 and be covered with a cloth (not shown) for support baby occupant thereon. The connector 23 is capable of releasably connecting the baby carrier 2 to the foldable frame 10. The seat frame 24 is connected to the connector 23 and capable of stretching the cloth (not shown) to support a baby occupant thereupon. The backrest frame 25 is pivotally connected to the seat frame 24 by a lockable joint and capable of converting the baby carrier 2 into the deployed position 26 and the folded position 27 by rotation. The backrest frame 25 may further be equipped with an unlocking mechanism 28 at one end for unlocking the backrest frame 25 from the deployed position 26. In this embodiment, the backrest frame 25 is also capable of stretching said cloth (not shown) to support the back of the baby occupant and shields to hide the release actuator 43 when the baby carrier 2 being converted into the deployed position 26.

Figure 4:
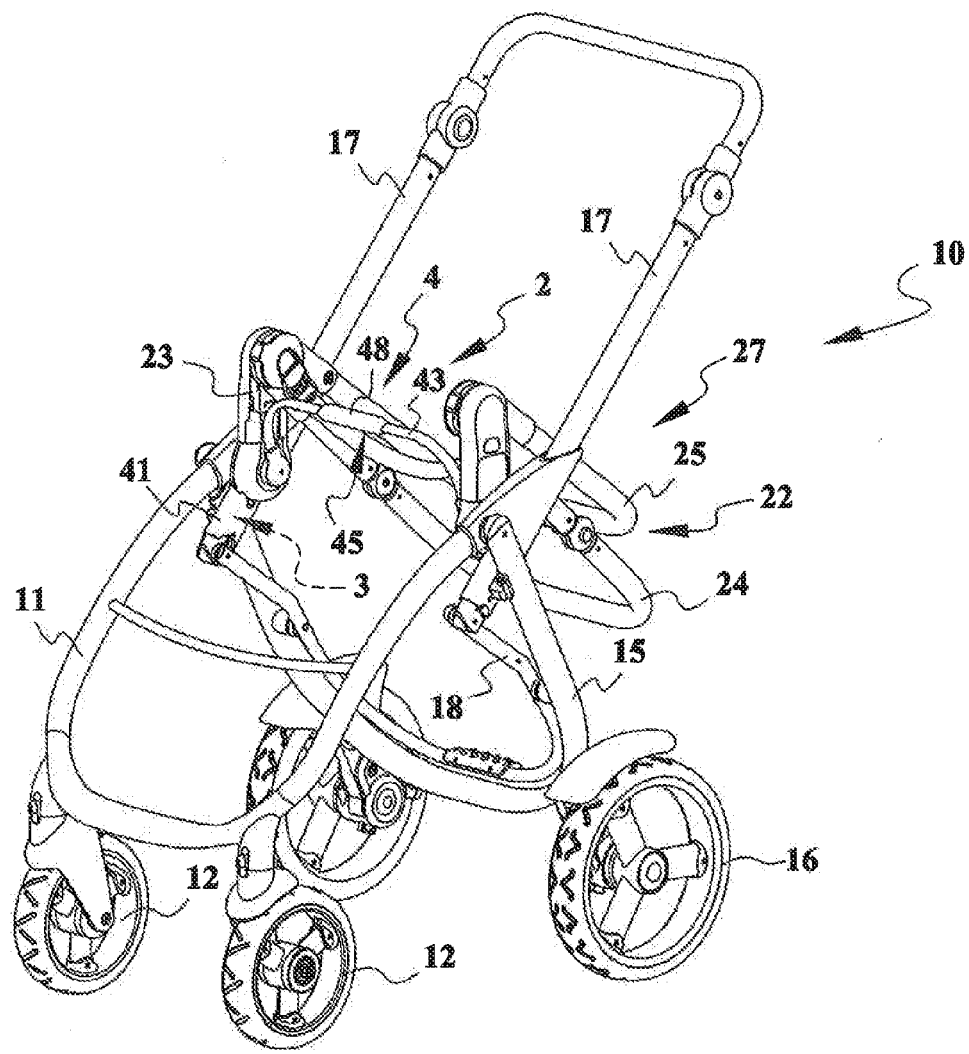
FIG. 4 is a perspective view showing the baby carrier of the stroller frame of FIG. 1 has been folded.
Figure 5:
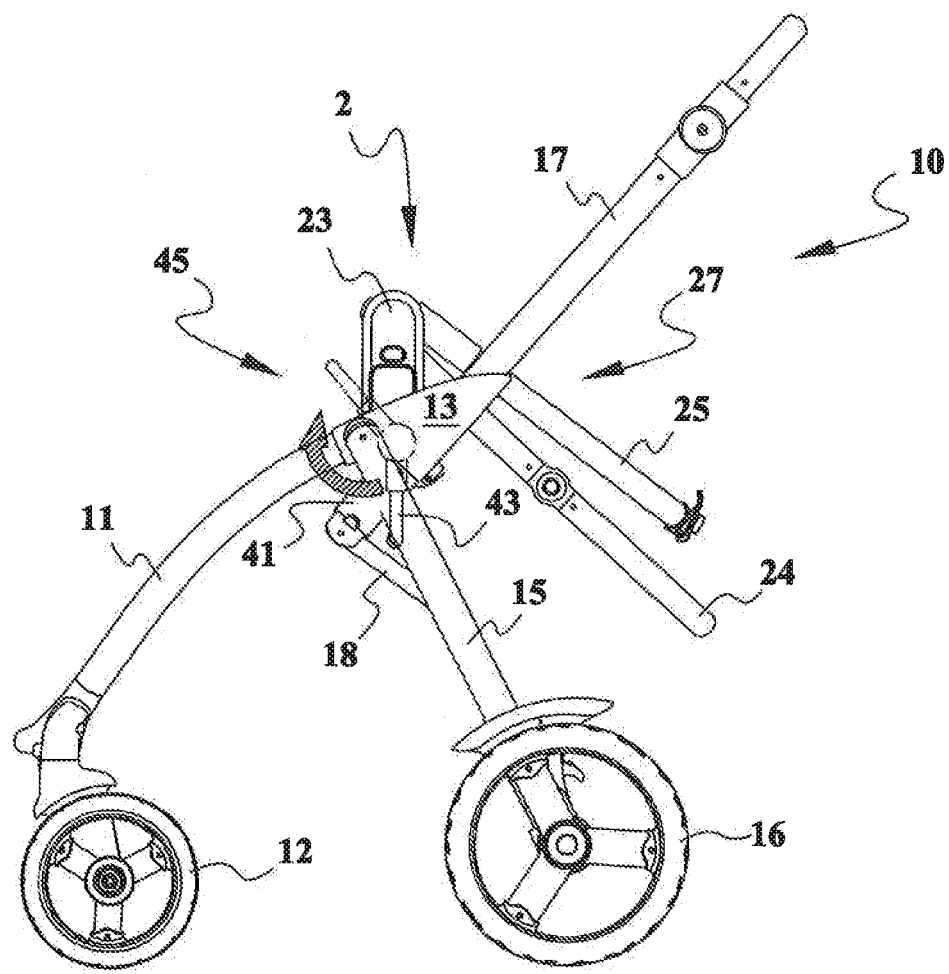
FIG. 5 is a side view showing the baby carrier of the stroller frame of FIG. 1 has been converted into a folded position.
Figure 6:
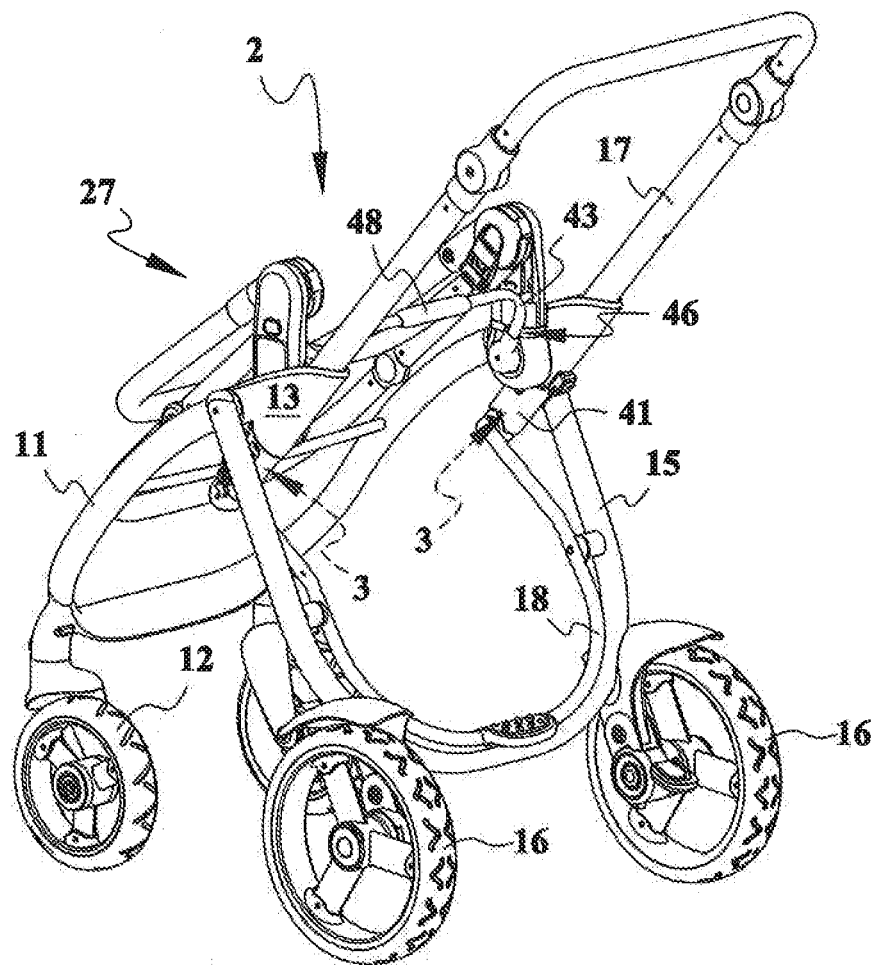
FIG. 6 is another perspective view showing the baby carrier of the stroller frame of FIG. 1 has been converted into a folded position for permitting access to the release actuator.
Figure 7:
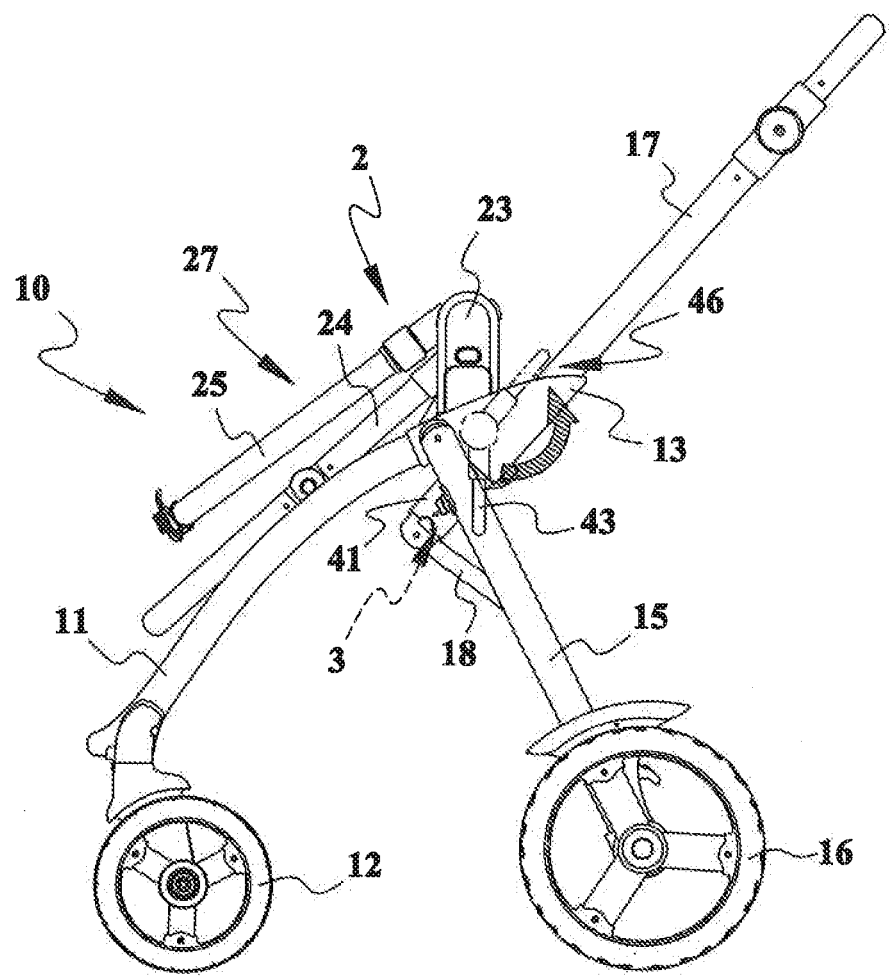
FIG. 7 is side view schematically showing the operation of the release actuator of the stroller frame of FIG. 1.

The foldable frame 10 includes a front strut 11, a rear strut 15, a pair of push arms 17 and a linking element 18. The front strut 11 has a pair of front wheels 12 pivoted at a front-lower end, and two joints 13 mounted on both side of the rear-upper end thereof. The rear strut 15 has a pair of rear wheels 16 pivoted at a rear-lower end, and a front upper end pivotally connected to the joint 13, by this way to permit front strut 11 and the rear strut 15 to rotate relative to each other. The pair of push arms 17 is slidably passing through the two joints 13 respectively and lockable by the locking mechanism 3 in a locked position as shown in FIGS. 4 and 5.

Figure 8:
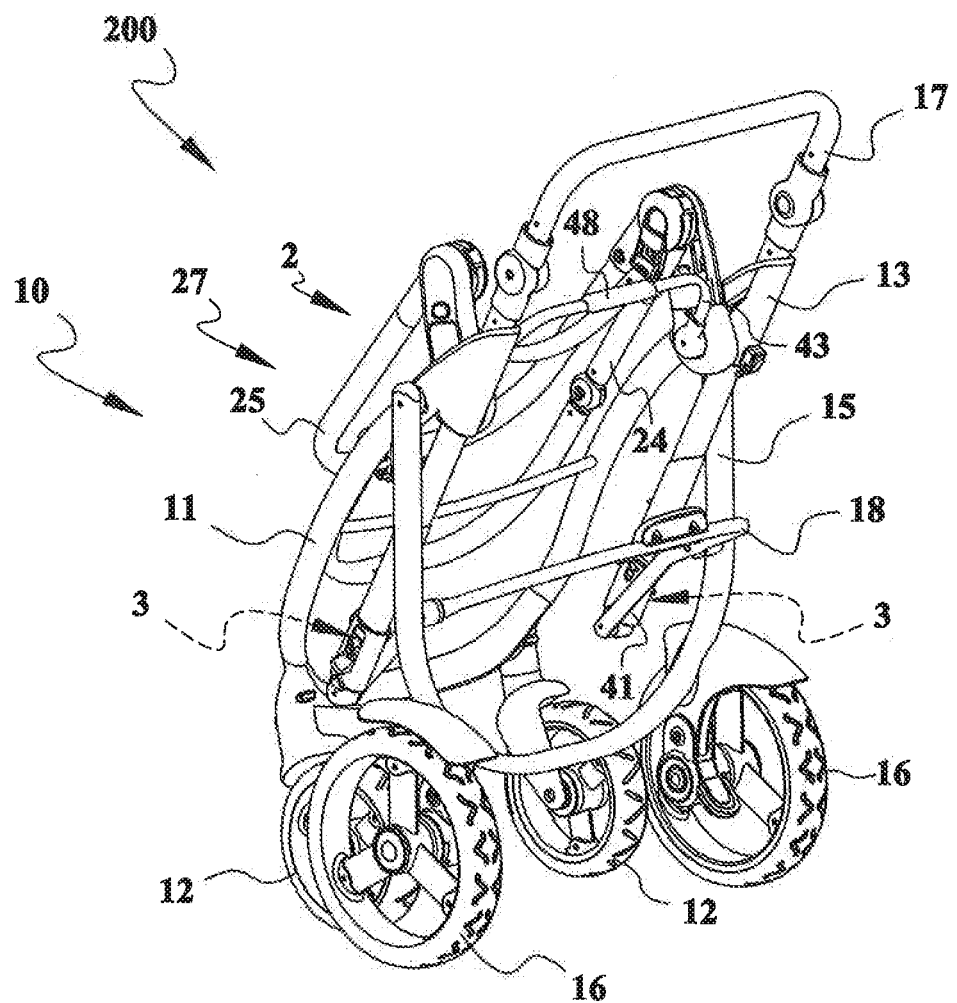
FIG. 8 is a perspective view showing the stroller frame of FIG. 1 converted into a folded configuration.

In this embodiment, the linking element 18 is pivotably connected between the lower end of the push arms 17 and the rear strut 15. When pair of push arms 17 is locked in the locked position as shown in FIGS. 4 and 5, the foldable frame 10 is kept in the erected configuration 100. When the pair of push arms 17 is unlocked from the locked position, it can slide downward from the two joints 13 to carry the linking element 18 to rotate, so as to drive the rear strut 15 to rotate and close to the front strut 11, as shown in FIG. 8.

In one embodiment of the present invention, the push arms 17 are lockable to the rear strut 15 by the locking mechanism 3. The rear strut 15 has two sides each formed with a first positioning portion 31, and the locking mechanism 3 may include two first latch elements 32 and two resilient elements 30. The two first latch elements 32 are retractably mounted within the push arms 17 and biased by the two resilient elements 30 toward the first positioning portion 31 thereby locking the push arms 17 to the rear strut 15.

Figure 3:
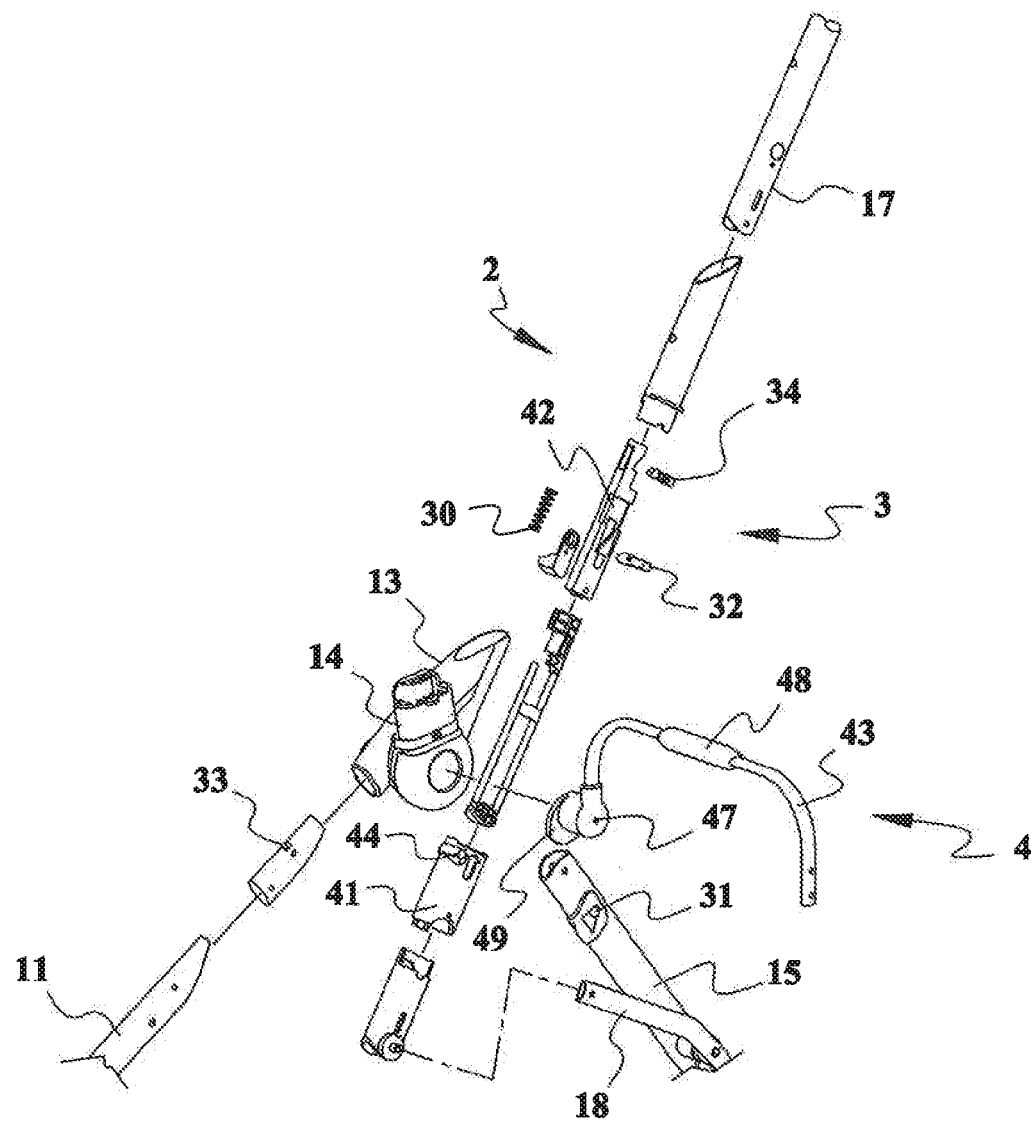
FIG. 3 is an exploded view showing the locking mechanism and the release mechanism of the stroller frame of FIG. 1.

In another embodiment of the present invention, as shown in FIG. 3, the upper end of the front strut 11 may further be formed with a second positioning portion 33, and the locking mechanism 3 each further include a second latch element 34 for engaging with the second positioning portion 33 so as to lock the push arms 17 to the front strut 11. By this way, the locking mechanism 3 can lock the pair of push arms in the locked position thereof more steady and firmly so as to lock the foldable frame in the erected configuration 100.

The release mechanism 4 according to the present invention may further include a sliding element 42 and a sleeve 41. The sliding element 42 is movably received in the push arms 17 for driving the first latch element 32 to withdraw from the first positioning portion 31 thereby unlocking the push arms 17 from the rear strut 15; and the sleeve 41 is operatively sleeved on the push arms 17 and associating between the sliding element 42 and the release actuator 43; wherein the sleeve 41 is driven by the release actuator 43 to move downward thereby driving the sliding element 42 to unlock the push arms 17 from the rear strut 15.

In one embodiment, the sliding element 42 may be formed with two skewed slots for driving the first latch element 32 and the second latch element 34 so as to withdraw the first latch element 32 from the first positioning portion 31, and withdraw the second latch element 34 from the second positioning portion 33.

The release actuator 43 may have two ends pivotally connected on the joints 13 respectively, and each ends of the release actuator 43 being formed with a cam-like extension 49 slidably abutted against the sleeve 41, so as to drive the sleeve 41 to move downward by rotation of the release actuator 43. Preferably, the release actuator 43 may be formed with a gripped portion 48 for either pushing or pulling by hand to rotate the release actuator 43.

As shown in FIG. 3, the sleeve 41 may be formed with a side extension 44 for slidably abutting against the cam-like extension 49. By this way, when the release actuator 43 is rotated either in the forward direction 45 or in the rearward direction 46, the cam-like extension 49 shall push the sleeve 41 and make the sliding element 42 to withdraw the first latch element 32 from the first positioning portion 31, and withdraw the second latch element 34 from the second positioning portion 33.

The release actuator 43 is formed with a gripped portion 48 for either pushing forward or pulling backward by hand to rotate the release actuator 43. Preferably, the release actuator 43 may be embodied as a U-shaped frame with two end portions 47 pivotally connected on the joints 13, and each end of the release actuator 43 may be formed with a cam-like extension 49 slidably abutted against the sleeve 41, so as to drive the sleeve 41 to move downward by rotation of the release actuator 43.

As the backrest frame 25 is shielded the release actuator 43 in the deployed position 26, shall prevent the care-giver from accessing to push or pull the release actuator 43 to fold the foldable frame 10 accidentally. By this way, the hiding of the release actuator 43 shall force the care-giver to hold up the baby occupant firstly for folding the baby carrier 2 into the folded position 27, and then can access the release actuator 43 to fold the foldable frame 10 thereafter.

Figure 9:
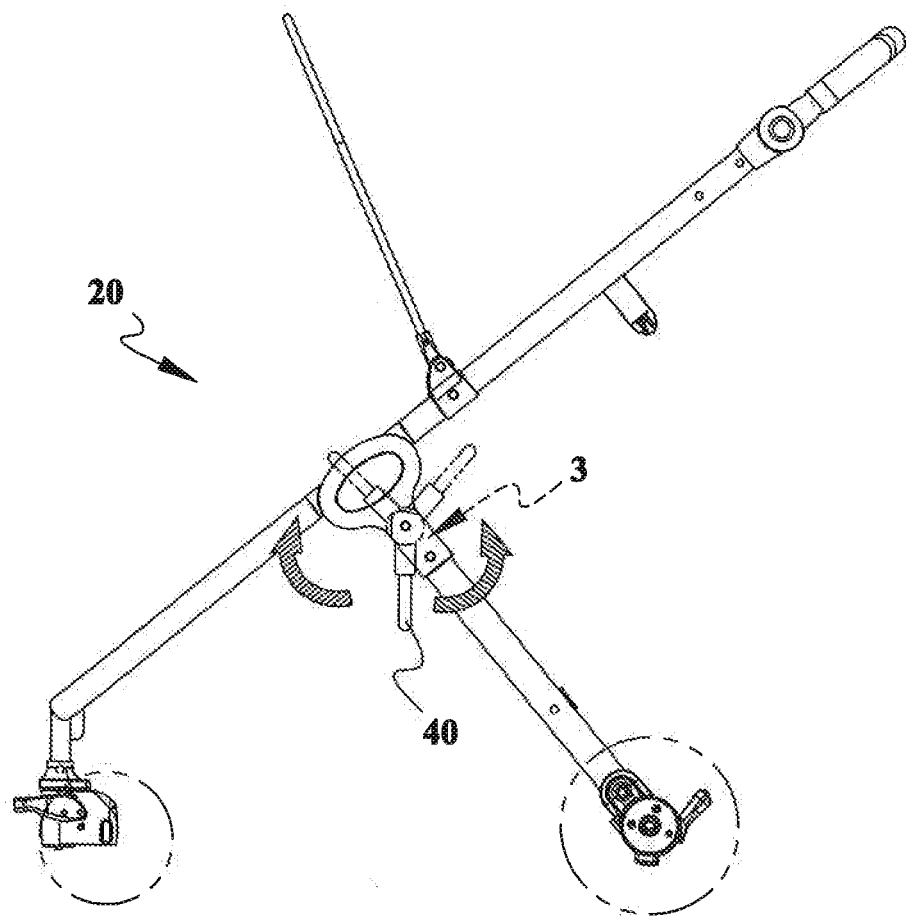
FIG. 9 is a perspective view showing an alternative embodiment of the stroller frame with a hidable release actuator according to the present invention.

As shown in FIG. 9, the above-described release mechanism 4 may be modified to be another release actuator 40 as being disclosed in Chinese Patent CN201320247281.1 for unlocking the locking mechanism 3 so as o fold the stroller frame 20 without endangering the baby occupant.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A stroller frame, including:
    a foldable frame (10), having an erected configuration (100) and a folded configuration (200);
    a locking mechanism (3), mounted on the foldable frame (10) for locking the foldable frame in the erected configuration (100);
    a release mechanism (4), having a release actuator (43) operatively mounted on the foldable frame (10) for unlocking the locking mechanism (3) by rotation in either a forward direction (45) or a rearward direction (46); and
    a baby carrier (2), having a deployed position (26) for supporting a baby occupant thereon and hiding the release actuator (43) thereunder and thereby blocking access to the release actuator (43) and preventing the locking mechanism (3) from unlocking, and a folded position (27) for permitting access to the release actuator (43);
    wherein the baby carrier (2) includes:
    a connector (23), for releasably connecting the baby carrier (2) to the foldable frame (10);
    a seat frame 1241 connected to the connector (23) for support a baby occupant thereon; and
    a backrest frame (25), pivotally connected to the seat frame (24) and capable of converting the baby carrier (2) into the deployed position (26) and the folded position (27) by rotation; wherein the backrest frame (25) is lockable into the deployed position (26), and wherein the backrest frame (25) is configured to support the back of the baby occupant and shields the release actuator (43) when the backrest frame (25) is locked in the deployed position (26);
    wherein the foldable frame (10) includes:

a front strut (11), having a pair of front wheels (12) pivoted at a front-lower end, and two joints (13) mounted on a rear-upper end thereof;

a rear strut (15), having a pair of rear wheels (16) pivotally connected at a rear-lower end, and a front upper end pivotally connected to the joints (13);

a pair of push arms (17), slidably passing through the two joints (13) respectively and lockable by the locking mechanism (3) in a locked position; and a linking element (18), pivotably connected between a lower end of the push arms (17) and the rear strut (15).

2. The stroller frame according to claim 1, wherein the foldable frame (10) is equipped with a pair of sockets (14) for releasably connecting the baby carrier (2) to the foldable frame (10).

3. The stroller frame according to claim 2, wherein the baby carrier (2) is selectable to connect to the foldable frame (10) either in a forward direction (21) or in a rearward direction (22).

4. The stroller frame according to claim 1, wherein the backrest frame (25) is equipped with an unlocking mechanism (28) for unlocking the backrest frame (25) from the deployed position (26).

5. The stroller frame according to claim 1, wherein the push arms (17) are lockable to the rear strut (15) by the locking mechanism (3).

6. The stroller frame according to claim 1, wherein the rear strut (15) has two sides each formed with a first positioning portion (31), and the locking mechanism (3) includes:

two first latch elements (32), retractably mounted within the push arms (17) respectively;

two resilient elements (30), biasing the two first latch elements (32) toward the first positioning portion (31) thereby locking the push arms (17) to the rear strut (15).

7. The stroller frame according to claim 6, wherein the front strut (11) has two sides each, is formed with a second positioning portion (33) at the upper end thereof, and the locking mechanism (3) includes two second latch elements (34) for engaging with the second positioning portions (33), respectively so as to lock the push arms (17) to the front strut (11).

8. The stroller frame according to claim 7, wherein the release mechanism (4) has two sides, each of which includes:

a sliding element (42), movably received in one of the push arms (17) and being formed with two skewed slots for driving one of the first latch elements (32) and one of the second latch elements (34) so as to withdraw said first latch element (32) from the first positioning portion (31), and withdraw said second latch element (34) from the second positioning portion (33); and a sleeve (41) operatively sleeved on the push arms (17) and associating between the sliding element (42) and the release actuator (43); wherein the sleeve (41) is driven by the release actuator (43) to move downward thereby driving the sliding element (42) to unlock the push arms (17) from the rear strut (15).

9. The stroller frame according to claim 8, wherein the release actuator (43) has two ends pivotally connected on the joints (13), and each of the ends of the release actuator (43) being formed with a cam-like extension (49) slidably abutted against the sleeve (41), so as to drive the sleeve (41) to move downward by rotation of the release actuator (43).

10. The stroller frame according to claim 9, wherein the sleeve (41) is formed with a side extension (44) for slidably abutting against the cam-like extension (49).

11. The stroller frame according to claim 8, wherein the release actuator (43) is formed with a gripped portion (48) for either pushing or pulling by hand to rotate the release actuator (43).

12. The stroller frame according to claim 6, wherein the release mechanism (4) includes:

a sliding element (42), movably received in the push arms (17) for driving the first latch elements (32) to withdraw from the first positioning portion (31) thereby unlocking the push arms (17) from the rear strut (15);

a sleeve (41) operatively sleeved on the push arms (17) and associating between the sliding element (42) and the release actuator (43); wherein the sleeve (41) is driven by the release actuator (43) to move downward thereby driving the sliding element (42) to unlock the push arms (17) from the rear strut (15).

13. The stroller frame according to claim 12, wherein the release actuator (43) has two ends pivotally connected on the joints (13), and each of the ends of the release actuator (43) being formed with a cam-like extension (49) slidably abutted against the sleeve (41), so as to drive the sleeve (41) to move downward by rotation of the release actuator (43).

14. The stroller frame according to claim 13, wherein the sleeve (41) is formed with a side extension (44) for slidably abutting against the cam-like extension (49).

15. The stroller frame according to claim 12, wherein the release actuator (43) is formed with a gripped portion (48) for either pushing or pulling by hand to rotate the release actuator (43).

* * * * *